United States Patent [19]

Goodman et al.

[11] Patent Number: 4,753,974
[45] Date of Patent: Jun. 28, 1988

[54] DISPERSIBLE ORGANOCLAY FOR UNSATURATED POLYESTER RESINS

[75] Inventors: Howard Goodman; Douglas N. Smith; Kathryn B. Dingle, all of St. Austell, United Kingdom

[73] Assignee: E C.C. International Limited, Great Britain

[21] Appl. No.: 68,850

[22] Filed: Jul. 1, 1987

Related U.S. Application Data

[63] Continuation-in-part of Ser. No. 940,988, Dec. 12, 1986.

[51] Int. Cl.$^4$ .......................... C08K 3/34; C04B 14/00
[52] U.S. Cl. .................................... 524/447; 106/309; 106/287.25; 106/308 N
[58] Field of Search ................... 106/309, 287, 287.25, 106/308 N; 524/447; 501/147, 145

[56] References Cited

U.S. PATENT DOCUMENTS

| | | | |
|---|---|---|---|
| 4,473,675 | 9/1984 | Knudson et al. | 523/508 |
| 4,623,398 | 11/1986 | Goodman et al. | 106/309 |
| 4,631,091 | 12/1986 | Goodman | 106/309 |
| 4,683,259 | 7/1987 | Goodman | 106/309 |
| 4,687,521 | 8/1987 | Nadeau | 106/309 |

FOREIGN PATENT DOCUMENTS 2090584  7/1982  United Kingdom .

Primary Examiner—Theodore Morris
Attorney, Agent, or Firm—Stefan J. Klauber

[57] ABSTRACT

An organophillic clay gellant which is readily dispersible in unsaturated polyester resin compositions without requiring first being dispersed in styrene to form a pregel, and the process of preparation thereof, are described.

15 Claims, No Drawings dispersible organoclay for
unsaturated polyester resins

This application is a continuation-in-part of U.S. patent application Ser. No. 940,988 filed Dec. 12, 1986 based on British patent application No. 85.31254 filed Dec. 19, 1985.

FIELD OF THE INVENTION

The invention concerns an organoclay, or organophilic clay composition, which is readily dispersible in unsaturated polyester resin compositions and is specially adapted to confer thixotropic properties thereon.

BACKGROUND OF THE INVENTION

Unsaturated polyester resins are generally formed by polymerising together an unsaturated dihydric alcohol, such as ethylene or propylene glycol, with an unsaturated dicarboxylic acid, such as maleic acid, fumaric acid or phthalic acid, or mixtures thereof. The polymerisation reaction is generally quenched by pouring the reaction mixture at a temperature of about 200° C. into system maintained at a temperature in the range 30°-80° C. The concentration of the resin in the styrene solution is generally about 70% by weight at this point, but further styrene is added to dilute the solution to about 50-5% by weight of resin for ease of handling in commercial applications. The styrene solution of the resin at a concentration in the range 50-55% by weight has almost Newtonian rheological properties so that when the resin is used to form a fibre-reinforced structure the solution tends to flow under gravity on vertical or inclined surfaces. It is customary, therefore, to incorporate into the styrene solution of the resin a thixotropic gelling agent. One gelling agent which has been successfully used is fumed silica, which may be stirred into the resin solution using moderate shear. However fumed silica has the disadvantages that its bulk density is very low, being of the order of 0.06 g.cm$^{-3}$ and that it generates hazardous dust. Its cost is also relatively high, the cost of the fumed silica being about 4% of the selling price of the resin solution.

Organoclays provide a possible alternative to fumed silica and have the advantages of being cheaper and less dusty than fumed silica and of having a higher bulk density in the range of from 0.3 to 0.8 g.cm$^{-3}$. However, organoclays generally have the disadvantage that they will not disperse and provide the required gelling properties if stirred directly into the solution of the polymer in styrene. It is necessary first to disperse the organoclay in styrene to form a "pregel" and then to mix the pregel with the polymer solution. An additional mixing stage is therefore required and the additional capital cost is not favoured by manufacturers. A further disadvantage is that, since the concentration of polymer in the styrene should be as high as possible, the quantity of styrene which can be added in the form of a pregel is limited and the highest concentration of organoclay in styrene which can be achieved before the suspension becomes undesirably viscous and difficult to handle is about 5% by weight. In cases therefore where a particularly viscous polyester resin composition is required, it may not be possible to use an organoclay as the thixotropic gelling agent.

The object of the invention is to provide an organoclay composition which can be stirred directly into a styrene solution of a polyester and which will provide thixotropic gelling properties.

British patent application No. 85.31254 corresponding to U.S. Ser. No. 940,988 of which this application is a continuation-in-part, describes a thixotropic gelling composition for unsaturated polyester resins which comprises a mixture of a smectite clay, a quaternary ammonium compound which is capable of rendering the smectite clay organophilic and a particulate second inorganic material, in particular finely divided silica having an average particle diameter in the range from 0.005 $\mu$m to 0.5 $\mu$m, the second inorganic material constituting from 10% to 50% by weight of the mixture. There is preferably used as the quaternary ammonium compound a mixture comprising from 25 mol % to 100 mol % of dimethyl benzyl hydrogenated tallow ammonium chloride (2MBHT) and from 75 mol % to 0 mol % of dimethyl di (hydrogenated tallow) ammonium chloride (2M2HT). The mixture of smectite clay, quaternary ammonium compound and second inorganic material in suspension in water is preferably subjected to high shear mixing for a time sufficient to dissipate in the mixture at least 100 KJ of energy per kg. of dry solids in the mixture.

U.S. Pat. No. 4,473,675 describes a thixotropic crosslinkable unsaturated polyester composition which comprises an aromatic unsaturated monomer having an amount of an organoclay dispersed therein. The organoclay comprises the reaction product of a smectite clay and a mixture of 2M2HT and 2MBHT, the amount of quaternary ammonium compounds used being from 95 to 140 milliequivalents per 100 g of dry clay.

British patent No. 2,090,584 describes an organoclay composition which can be stirred directly into a solution of a polyester in styrene (page 32, lines 23-27 and 52-55), but the organoclay, in addition to the quaternary ammonium compound, also requires from 5-100 milliequivalents per 100 g of dry smectite clay of an organic anionic compound (page 5, lines 20-22).

SUMMARY OF THE INVENTION

The invention concerns a process for preparing an organophilic clay gellant which is particularly adapted for increasing the viscosity of unsaturated polyester resins, the process comprising the following steps:

(a) an aqueous suspension of a smectite clay is subjected to a particle size separation to remove from the smectite clay substantially all particles having a diameter larger than 53 $\mu$m;

(b) the suspension of smectite clay particles smaller than 53 $\mu$m which is the product of step (a) is subjected to high shear mixing under conditions such that at least 100 KJ of energy per kg of dry smectite clay is dissipated in the suspension;

(c) the pH of the suspension which is the product of step (b) is adjusted to lie within the range from about 2 to about 6, preferably from about 2.5 to about 5.5;

(d) the suspension which is the product of step (c) is mixed with one or more quaternary ammonium compounds having at least one higher alkyl group containing from 10 to 24 carbon atoms in proportions such as to provide from 95 to 140 milliequivalents of quaternary ammonium compounds per 100 g of dry smectite clay; and (e) the mixture formed in step (d) is dewatered, dried and the dried material comminuted to provide a particulate material substantially all of which passes through a sieve of nominal aperture 0.250 mm.

In step (a) the smectite clay may be, for example, bentonite, montmorillonite, hectorite, saponite, beidellite, nontronite or fuller's earth. The smectite clay is preferably mixed with water, and optionally a dispersing agent for the smectite clay, to form a suspension containing from about 1% to about 10% by weight of the smectite clay and the suspension is then passed through a sieve of nominal aperture 53 μm. The suspension passing through the sieve may then be subjected to a further particle size separation step by gravitational or centrifugal sedimentation.

In step (b) the suspension of smectite clay particles of diameter smaller than 53 μm is preferably subjected to high shear mixing in a homogenizer of the type in which the suspension is forced in the form or a thin film edgewise through a thin, hard surfaced gap under a pressure of at least 250 pounds per square inch (1.7 MPa) and at a high velocity. A suitable homogenizer is described in British patent No. 987176 (or in U.S. Pat. Nos. 3,039,703 and 3,162,379). Such a homogenizer is manufactured by the Manton-Grulin Company. Advantageously, the homogenizer is operated at a pressure of at least 1500 pounds per square inch (10.5 MPa). The amount of energy, in KJ per kg of dry solids, dissipated in the suspension is given by the expression:

$$E = \frac{nP \cdot 10^3}{w}$$

where P is the pressure in MPa exerted in the homogenizer, n is the number of passes through the homogenizer, and w is the weight of grams of dry solids in 1 litre of the aqueous suspension.

In step (b) there may be added to the aqueous suspension of the smectite clay a aqueous suspension of a second inorganic material which is advantageously finely divided silica having an average particle diameter in the range from 0.005 μm to 0.5 μm. The second inorganic material suitably constitutes from 10% to 50% by weight of the mixture of smectite clay, second inorganic material and quaternary ammonium compound.

The aqueous suspension of the second inorganic material is preferably also subjected to high shear mixing under conditions such that at least 100 KJ of energy per kg. of dry smectite clay is dissipated in the suspension. Either the aqueous suspension of the smectite clay and the aqueous suspension of the second inorganic material are each subjected separately to high shear mixing and the two suspensions are then mixed together or the suspensions of smectite and second inorganic material are first mixed together and the mixed suspension subjected to high shear mixing.

In step (c) the pH of the suspension produced in step (b) is preferably treated with a dilute acid which may be, for example, hydrochloric acid, suphuric acid, nitric acid, phosphoric acid or acetic acid. Alternatively water soluble salts of a strong acid and a weak base, for example aluminum chloride or aluminum suphate may be used. Advantageously the pH of the suspension is adjusted to lie within the range from 3 to 5.

In step (d) the quaternary ammonium compounds are preferably chosen from the group which can be represented by the general formula:

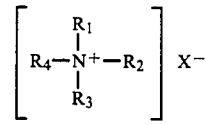

wherein $R_1$ is a saturated or unsaturated alkyl group having from 10 to 24 carbon atoms, $R_2$ and $R_3$, which may be the same or different, are each a saturated or unsaturated alkyl group having from 1–24 carbon aroms or an aralkyl group having from 7 to 10 carbon atoms, $R_4$ is an alkyl group having from 1 to 6 carbon atoms or an aralkyl group having from 7 to 10 carbon atoms, and X is OH, Cl, Br, I. $NO_2$, $CH_3SO_4$ or $CH_3$. COO. Examples of such quaternary ammonium compounds are the methyl benzyl dialkyl ammonium chlorides, the dimethyl dialkyl ammonium chlorides, the dimethyl benzyl alkyl ammonium chlorides, the benzyl trialkyl ammonium chlorides, and the methyl trialkyl ammonium chlorides in which the alkyl group is a mixture of hydrocarbon radicals derived from tallow having from 14 to 20 carbon atoms but in which C18 radicals predominate. (A typical analysis of such a mixture of hydrocarbon radicals contained in tallow is: $C_{14}$ 4.5%; $C_{15}$ 0.5%; $C_{16}$ 30.5%; $C_{17}$ 1.5%; $C_{18}$ 62.0% and $C_{20}$ 1.0%). The hydrocarbon radicals may be partially unsaturated as a result of treating the tallow with hydrogen in he presence of a suitable catalyst.

Most preferably the suspension produced in step c) is treated with a mixture of methyl benzyl di (hydrogenated tallow) ammonium chloride (MB2HT) and dimethyl benzyl hydrogenated tallow ammonium chloride (2MBHT) in proportions ranging from 25 mol % of MB2HT and 75 mol % of 2MBHT to 100 mol % of MB2HT and 0 mol % of 2MBHT.

In step (e) the suspension of the product formed by reacting the smectite clay wirh the quaternary ammonium compounds is preferably dewatered by filtration or by centrifugation, optionally washed with water, and thermally dried.

The dry material is then lightly comminuted to yield a product consisting of particles substantially all of which pass through a sieve of nominal aperture 0.250 mm. Particles prepared in this way are ideally suited for incorporation into a cross-linkable, unsaturated polyester resin composition.

Detailed Description

The following examples are intended to be illustrative of the invention but not limitative.

EXAMPLE I

An aqueous suspension of bentonite was prepared by mixing raw Wyoming sodium bontonite in a blunger with sufficient water to form a suspension containing 10% by weight of dry clay. The suspension thus formed was passed through a No. 300 mesh British Standard sieve (nominal aperture 0.053 mm) and the undersize fraction was diluted to 4% by weight of solids with water and subjected to a particle size separation in a nozzle discharge, disc centrifuge at a flow rate of 1 litre per minute. The fine product of the cenrrifuge, at a solids content of 2.5% by weight, was then passed once through a Manton-Gaulin homogenizer at a pressure of 400%. psi (27.6 MPa). The energy dissipated in the suspension during the single pass through the Manton-Gaulin homogenizer was 1089 KJ per kg of dry clay.

The suspension was then divided into fourteen portions and each portion was heated to 70° C. and treated with a different quantity of 10% by weight hydrochloric acid solution to give a different pH value in the range from 2 to 8. During and after the addition of acid the suspension was stirred by means of a laboratory paddle mixer for a total time of 10 minutes, and there was then added to each portion 105 milliequivalents per 100 g of dry bentonite of a mixture consisting of 75 mol % of MB2HT and 25 mol % of 2MBHT and stirring was continued for a further 30 minutes. Each organoclay thus formed was separated from the liquid medium by filtration and the filter cake was crumbled and dried in a fludized bed dryer for 1 hour, 15 minutes at 60° C. In each case the dried product was screened on a No. 60 mesh British Standard sieve (nominal aperture) 0.250 mm) and the fraction passing through the sieve was stirred into an unsaturated polyester resin composition using a laboratory stirrer rotating at 3,500 rpm. The amount of dry organoclay incorporated into the polyester resin composition was 1% by weight based on the weight of the resin and the resin was a rapid-curing, general-purpose polyester resin marketed by the Scott Bader Company Limited under the tradename. "CRYSTIC 196" ("CRYSTIC" is a Registered Trademark) which is believed to be a copolymer of o-phthalic acid, fumaric acid and propylene glycol, having a number average molecular weight of about 4,500.

The viscosity of the polyester resin composition containing each of the fourteen organoclays as a gelling agent was measured using a Brookfield viscometer at a spindle speed of 0.5 rpm.

The results are set forth in Table I below:

TABLE I

| pH of bentonite suspension | Viscosity of polyester resin composition (mPa.s) |
| --- | --- |
| 1.98 | 3200 |
| 2.00 | 3000 |
| 2.50 | 5200 |
| 2.50 | 5600 |
| 2.98 | 8000 |
| 3.00 | 5800 |
| 3.35 | 7600 |
| 3.49 | 6000 |
| 4.00 | 6400 |
| 4.03 | 7000 |
| 4.90 | 5600 |
| 5.87 | 3400 |
| 7.03 | 3000 |
| 8.08 | 3200 |

The results indicate that the gelling properties of the organoclay in an unsaturated polyester resin composition are best when the pH of the bentonite suspension has been adjusted to lie within the range from about 3 to about 4 before preparation of the organoclay.

EXAMPLE 2

An aqueous suspension of bentonite was prepared and treated in exactly the same way as is described in Example 1 above as far as the treatment in the Manton-Gaulin homogenizer. The suspension which had been treated in the homogenizer was then divided into eight portions and each portion was treated with a different quantity of 10% by weight hydrochloric acid solution to give a different pH value in the range from 2 to 9. The acid-treated suspension was then passed once through the Manton-Gaulin homogenizer at a pressure of 4000 psi (37.6 MPa) and there was added to the feed container of the homogenizer sufficient of a 1% emulsion in water of a mixture of quaternary ammonium compounds to provide 100 milliequivalents of the mixed quaternary ammonium compounds per 100 g of dry bentonite. The mixture of quaternary ammonium compounds consisted of 50 mol % of dimethyl di (hydrogenated tallow) ammonium chloride (2M2HT) and 50 mol % of 2MBHT. Each organoclay thus formed was separated from the liquid medium by filtration and the filter cake was dried and screened as described in Example 1.

Each dry organoclay thus formed was stirred into an unsaturated polyester resin composition in an amount equivalent to 1% by weight, based on the weight of the resin. In this case the resin was a polyester resin marketed by British Industrial Plastics Limited under the tradename. "BEETLE 8128". ("BEETLE" is a Registered Trademark).

The viscosity of the polyester resin composition containing each of the eight organoclays as a gelling agent was measured using a Brookfield viscometer at a spindle speed of 0.5 rpm.

The results are set forth in Table II below:

TABLE II

| pH of bentonite suspension | Viscosity of polyester resin composition (mPa.s) |
| --- | --- |
| 9.05 | 1200 |
| 7.78 | 1000 |
| 6.97 | 1000 |
| 5.90 | 1600 |
| 5.00 | 2000 |
| 4.09 | 2200 |
| 3.08 | 2600 |
| 2.08 | 3800 |

Here it can be seen that, with the combination of quaternary ammonium compounds which were used in this Example, the best gelling action in the polyester resin is achieved when the pH of the bentonite suspension is 2, and that when the pH of the bentonite suspension is above about 6 the gelling effect is negligible.

EXAMPLE 3

The same raw bentonite as was described in Example I was treated in the same manner as described therein except that different portions of the bentonite suspension were passed through the Manton-Gaulin homogenizer at different pressures or for a different number of passes. In each case the suspension passed through the homogenizer contained 2.59% by weight of dry bentonite.

Each bentonite suspension which had been passed through the homogenizer was treated with a 0.0025 M solution of aluminum chloride in water to give a pH of 4.55.

Each suspension was then mixed with sufficient of a mixture consisting of 75 mol % of MB2HT and 25 mol % of 2MBHT to provide 105 milliequivalants of mixed quaternary ammonium compounds per 100 g of dry bentonite. The method of preparing, filtering, drying and screening each organoclay was as described in Example 1.

Each dry organoclay was stirred into the same unsaturated polyester resin as was described in Example 1 in an amount equivalent to 1% by weight based on the weight of the resin and the viscosity of the resin composition containing each organoclay as a gelling agent was measured using a Brookfield viscometer at a spindle speed of 0.5 rpm.

The results are set forth in Table III below:

TABLE III

| Pressure in homogenizer (psi) | (MPa) | No. of passes through homogenizer | Energy dissipated in bentonite suspension (KJ kg$^{-1}$) | Viscosity of polyester resin composition (mPa.s) |
|---|---|---|---|---|
| 4000 | 27.6 | 1 | 1038 | 4200 |
| 4000 | 27.6 | 2 | 2076 | 4600 |
| 4000 | 27.6 | 3 | 3114 | 6200 |
| 5500 | 37.9 | 1 | 1425 | 6000 |
| 7000 | 48.3 | 1 | 1816 | 6800 |

EXAMPLE 4

The same raw bentonite as was described in Example 1 was treated in the same way as described therein as far as the treatment in the Manton-Gaulin homogenizer. The suspension which had been treated in the homogenizer was treated with sufficient 10% by weight hydrochloric acid solution to reduce the pH of the suspension to 4 and the acid treated suspension was divided into four portions. Each portion was heated to a temperature of 70° C. and treated with a different quantity of a mixture consisting of 75% mol % of MB2HT and 25 mol % of 2MBHT in the manner described in Example 1. The four organoclay suspensions produced thereby were dewatered by filtration, dried and screened as described in Example 1 and each dry organoclay was stirred into the same unsaturated polyester resin composition as was used in Example 1 in an amount equivalent to 1.5% by weight, based on the weight of the resin.

The viscosity of the polyester resin composition containing each of the four organoclays as a gelling agent was measured using the Brookfield viscometer at spindle speed of 0.5 rpm.

The results are set forth in Table IV below:

TABLE IV

| Milliequivalents of quaternary ammonium compounds per 100 g of bentonite | Viscosity of polyester resin composition (mPas) |
|---|---|
| 100 | 11600 |
| 105 | 14400 |
| 110 | 10400 |
| 115 | 14000 |

These results show that the optimum viscosifying effect is achieved when the organoclay contains 105 milliequivalents of the mixture of quaternary ammonium compounds and that there is little advantage in using a larger quantity.

EXAMPLE 5

The same raw bentonite as was described in Example 1 was treated in the same way as described therein as far as the treatment in the Manton-Gaulin homogenizer. A suspension was also prepared containing 4.3% by weight of a precipitated silica having a median ultimate particle diameter of 0.03 μm. This silica suspension was also passed once through the Manton-Gaulin homogenizer at a pressure of 4000 psi (27.6 MPa), there being dissipated in the suspension 625 KJ of energy per kg of dry silica.

The suspension of bentonite and the suspension of silica were then mixed in proportions such that the amount of silica present in the final dry organoclay was 20% by weight based on the total dry weight of silica, bentonite and quaternary ammonium compounds. The suspensions were mixed together in a vessel which was stirred by means of a laboratory paddle mixer and which was heated on a water bath to maintain the temperature of the mixed suspensions at 65° C. There was added to the mixture sufficient 10% by weight hydrochloric acid solution to lower the pH to 4 followed by a solution in isopropyl alcohol of a mixture consisting of 75 mol % of 2MBHT and 25 mol % of 2M2HT, the quantity of the mixture of the quaternary ammonium compounds being such as to provide 100 milliequivalents of quaternary ammonium compounds per 100 g of dry bentonite. The organoclay thus formed was dewatered by filtration and dried as described in Example 1. The dry organoclay was then divided into three portions which were then comminuted under different conditions to give comminuted products consisting of particles substantially all of which were smaller than 0.250 mm, 0.120 mm and 0.080 mm respectively.

Each comminuted organoclay was stirred into the same unsaturated, polyester resin composition as was used in Example I, in an amount equivalent to 1.5% by weight, based on the weight of the resin.

The viscosity of the polyester resin compositions containing each of the three organoclays as a gelling agent was measured using the Brookfield viscometer at a spindle speed of 0.5 rpm.

The results are set forth in Table V below:

TABLE V

| Comminuted such that ca. 100% by weight of the particles are smaller than (mm) | Viscosity of polyester resin composition (mPas) |
|---|---|
| 0.250 | 11120 |
| 0.120 | 8400 |
| 0.080 | 7000 |

These results show that in order to achieve the best viscosifying effect the dry organoclay should not be comminuted any more finely than is necessary to achieve a maximum particle size of about 0.250 mm.

EXAMPLE 6

An organoclay was prepared by the method described in Example 1, the amount of 10% by weight hydrochloric acid solution added being sufficient to lower the pH of the bentonite suspension to 4 and the mixture of quaternary ammonium compounds consisting of 75 mol % of MB2HT and 25 mol % of 2MBHT in an amount sufficient to provide 105 milliequivalents of quaternary ammonium compounds per 100 g of dry bentonite.

Portions of the dry organoclay thus formed were stirred, in an amount equivalent to 1% by weight based on the weight of the resin, into eight different unsaturated polyester resin compositions.

As a comparison, there was also stirred into second samples of each of the resin compositions 1% by weight, based on the weight of the resin, of a fumed silica which was of the type marketed by Degussa AG under the tradename "AEROSIL 200".

This fumed silica had a specific surface area, as measured by the BET nitrogen adsorption method, of 200±m$^2$g$^{-1}$ and an average ultimate particle diameter of 0.012 μm.

The viscosity of each of the sixteen polyester resin compositions containing either the organoclay or the fumed silica as a gelling agent, was measured using the Brookfield viscometer at a spindle speed of 0.5 rpm.

The results are set forth in Table VI before:

TABLE VI

| Polyester resin | Number average molecular weight | Mean acid number | Viscosity of polyester resin composition (mPas) | |
|---|---|---|---|---|
| | | | organoclay | fumed silica |
| CRYSTIC 196 | 4500 | na | 6000 | 8400 |
| CRYSTIC (Australian) | 3500 | 19 | 4000 | 2800 |
| U.S. Polyester A | 5000 | 30 | 4600 | 2800 |
| U.S. Polyester B | 3000 & 10,000[1] | 19 | 4400 | 2800 |
| U.S. Polyester C | 20,000 | 20.5 | 4200 | 3000 |
| U.S. Polyester D | 2500 | 21 | 4600 | 5400 |
| U.S. Polyester E | 2000 | 28 | 4800 | 3200 |
| U.S. Polyester F | 30,000 | 12 | 6000 | 8400 |

Note
[1]This appeared to be a mixture of two copolymers each with its own average molecular weight.

Thus, in five of the eight polyester resin compositions the organoclay prepared in accordance with the invention gives an enhanced viscosifying effect as compared with the conventional fumed silica stir-in gelling agent.

While this invention has been particularly set forth in terms of specifics, it is understood in view of this disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A process for preparing an organoclay gellant, comprising the steps of:
   (a) subjecting an aqueous suspension of a smectite clay to a particle size separation to remove from the smectite clay substantially all particles having a diameter larger than 53 μm;
   (b) subjecting said suspension of smectite clay particles smaller than 53 μm to high shear mixing under conditions such that at least 100 KJ of energy per kg of dry smectite clay is dissipated in the suspension;
   (c) adjusting the pH of said suspension that has been subjected to high shear mixing to lie within the range of from about 2 to about 6; and
   (d) mixing said suspension having a pH in said range with one or more quaternary ammonium compounds having at least one higher alkyl group containing from 10 to 24 carbon atoms in proportions such as to provide from 95 to 140 milliequivalents of quaternary ammonium compounds per 100 g of dry smectite clay.

2. The process as set forth in claim 1 in which after the smectite clay has been treated with the quaternary ammonium compound(s) it is dewatered and dried.

3. The process as set forth in claim 2 in which the dewatered and dried material is comminuted to provide a particulate material substantially all of which passes through a sieve of nominal aperture 0.250 mm.

4. The process as set forth in claim 1 in which said pH is in the range of about 2.5 to about 5.5.

5. The process as set forth in claim 1 in which said pH is in the range of about 3 to about 4.

6. The process as set forth in claim 1 in which said suspension of smectite clay particles of diameter smaller than 53 μm is subjected to high shear mixing in a homogenizer of the type in which the suspension is forced in the form of a thin film edgewise through a thin, hard surfaced gap under a pressure of at least 250 pounds per square inch (1.7 MPa) and at a high velocity.

7. The process as set forth in claim 1 in which the quaternary ammonium compound are selected from the class consisting of compounds which can be represented by the general formula:

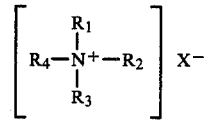

wherein $R_1$ is a saturated or unsaturated alkyl group having from 10 to 24 carbon atoms, $R_2$ and $R_3$, which may be the same or different, are each a saturated or unsaturated alkyl group having from 1 to 24 carbon atoms or an aralkyl group having from 7 to 10 carbon atoms, $R_4$ ir an alkyl group having from 1 to 6 carbon atoms or an aralkyl group having from 7 to 10 carbon atoms, and X is OH, Cl, Br, I, $NO_2$, $CH_3SO_4$ or $CH_3COO$.

8. The process as set forth in claim 7 in which the quaternary ammonium compounds comprise methyl benzyl di (hydrogenated tallow) ammonium chloride (MB2HT) and dimethyl benzyl hydrogenated tallow ammonium chloride (2MBHT) in proportions ranging from 25 mol % of MB2HT and 75 mol % of 2MBHT to 100 mol % of MB2HT and 0 mol % of 2MBHT.

9. The process as set forth in claim 1 in which there is added to said aqueous suspension of smectite clay particles smaller than 53 μm an aqueous suspension of a second inorganic material being a finely divided silica having an average particle diameter in the range of 0.005 μm to 0.5 μm.

10. The process as set forth in claim 9 in which said second inorganic material constitutes from 10% to 50% by weight of the mixture of smectite clay, second inorganic material and quaternary ammonium compound.

11. The process as set forth in claim 9 in which either the aqueous suspension of the smectite clay and the aqueous suspension of the second inorganic material are each subjected separately to high shear mixing and the two suspensions are then mixed together or the suspensions of smectite clay and second inorganic material are first mixed together and the mixed suspension subjected to high shear mixing.

12. An organoclay composition which is readily dispersible in unsaturated polyester resin compositions, made by a process comprising the steps of:
   (a) subjecting an aqueous suspension of a smectite clay to a particle size separation to remove from the smectite clay substantially all particles having a diameter larger than 53 μm;
   (b) subjecting said suspension of smectite clay particles smaller than 53 μm to high shear mixing under conditions such that at least 100 KJ of energy per kg of dry smectite clay is dissipated in the suspension;
   (c) adjusting the pH of said suspension that has been subjected to high shear mixing to lie within the range from about 2 to about 6; and
   (d) mixing said suspension having a pH in said range with one or more quaternary ammonium compounds having at least one higher alkyl group containing from 10 to 24 carbon atoms in proportions such as to provide from 95 to 140 milliequivalents of quaternary ammonium compounds per 100 g of dry smectite clay.

13. An organoclay composition as set forth in claim 12 in which there is added to said aqueous suspension of smectite clay particles smaller than 53 $\mu$m an aqueous suspension of a second inorganic material being a finely divided silica having an average particle diameter in the range of 0.005 $\mu$m to 0.5 $\mu$m.

14. An unsaturated polyester resin composition including a minor amount of an organoclay composition, made by a process comprising the steps of:
   (a) subjecting an aqueous suspension of a smectite clay to a particle size separation to remove from the smectite clay substantially all particles having a diameter larger than 53 $\mu$m;
   (b) subjecting said suspension of smectite clay particles smaller than 53 $\mu$m to high shear mixing under conditions such that at least 100 KJ of energy per kg of dry smectite clay is dissipated in the suspension;
   (c) adjusting the pH of said suspension that has been subjected to high shear mixing to lie within the range from about 2 to about 6; and
   (d) mixing said suspension having a pH in said range with one or more quaternary ammonium compounds having at least one higher alkyl group containing from 10 to 24 carbon atoms in proportions such as to provide from 95 to 140 milliequivalents of quaternary ammonium compounds per 100 g of dry smectite clay.

15. An unsaturated polyester resin composition as set forth in claim 14 in which there is added to said aqueous suspension of smectite clay particles smaller than 53 $\mu$m an aqueous suspension of a second inorganic material being a finely divided silica having an average particle diameter in the range of 0.005 $\mu$m to 0.5 $\mu$m.

* * * * *